(12) United States Patent
Bohler

(10) Patent No.: US 6,746,024 B2
(45) Date of Patent: Jun. 8, 2004

(54) CHUCK WITH ANGULAR COMPENSATION

(75) Inventor: Erwin Bohler, Bettwiesen (CH)

(73) Assignee: Forkardt Schweiz AG, Effretikon (CH)

( * ) Notice: Subject to any disclaimer, the term of this patent is extended or adjusted under 35 U.S.C. 154(b) by 0 days.

(21) Appl. No.: 10/054,263

(22) Filed: Jan. 22, 2002

(65) Prior Publication Data

US 2003/0205866 A1 Nov. 6, 2003

(30) Foreign Application Priority Data

Mar. 5, 2001 (EP) .............................................. 01104537

(51) Int. Cl.[7] .............................................. B23B 31/175
(52) U.S. Cl. .................... 279/132; 279/119; 279/123
(58) Field of Search ................. 279/114, 119, 279/132, 123

(56) References Cited

U.S. PATENT DOCUMENTS

| 1,844,616 A | 2/1932 | Whiton | |
|---|---|---|---|
| 2,896,958 A | * 7/1959 | Strauss | 279/123 |
| 4,706,973 A | * 11/1987 | Covarrubias et al. | 279/153 |
| 4,796,900 A | 1/1989 | Gant et al. | |
| 5,542,686 A | * 8/1996 | Revuelta | 279/153 |
| 5,984,321 A | * 11/1999 | Gruttadauria | 279/123 |

FOREIGN PATENT DOCUMENTS

| DE | 41 32 841 A | 4/1993 |
|---|---|---|
| FR | 1 095 483 A | 6/1955 |
| GB | 148 383 A | 7/1920 |

\* cited by examiner

*Primary Examiner*—Steven C. Bishop
(74) *Attorney, Agent, or Firm*—Olson & Hierl, Ltd.

(57) ABSTRACT

The chuck comprises jaws which, in addition to their radial movement, can each swivel around an axis essentially parallel to the axis of the chuck, and where this axis glides in a radial slideway of the chuck in order to allow said radial movement. This swivelling action ensures that the working surfaces of the jaws or of shoes sitting on them which are adapted to the outer shape of the workpiece will sit evenly on the workpiece even when the latter is mounted between centers and as a consequence its rotation axis does not coincide exactly with that of the chuck.

11 Claims, 2 Drawing Sheets

CHUCK WITH ANGULAR COMPENSATION

BACKGROUND OF THE INVENTION

The invention relates to a compensating chuck for machine tools which makes it possible to grip a workpiece mounted between centers even on slightly eccentric surfaces without deteriorating the same or exerting undesirable bending moments on the workpiece. This is in particular necessary when the workpiece is mounted between centers, so that these determine its rotation axis during a particularly precise machining step, whilst the workpiece must simultaneously be griped by the collet of a chuck in order to transmit a sizeable moment to it e.g. to perform an eccentric grinding. Because of unavoidable allowances of the surface of the workpiece that is griped by the collet, one must expect that the rotation axis of the collet—simply called chuck axis hereafter—will not coincide exactly with the actual rotation axis of the workpiece, which axis is dictated by the centers.

In order to avoid an uneven pressure of the jaws of the chuck on the surface which they grip, and the undesirable forces which this generates, the radial positions of the jaws must automatically respond to a possible eccentricity of the surface of the workpiece which they clamp. Balancing chucks with so-called compensating jaws are known which are built so that their jaws need not all have the same radial distance from the axis of the jaw because the chuck automatically equalizes the clamping forces exerted on the jaws. This can be achieved e.g. by using for the transmission of the clamping forces a hydraulic system which is geometrically identical for all jaws, but it can also be obtained through the use of a wobble plate which evenly distributes the clamping force over all jaws. However, a mere radial adaptation of the position of the jaws to the eccentricity that possibly exists between the rotation axis and the chuck axis neglects another problem that becomes ever more important because of the presently extremely high requirements with regard to the precision of the machining. This is because it corrects the radial distances between the jaws and the chuck axis, but does not eliminate the fact that due to the eccentricity the jaws do not point precisely towards the chuck axis. In practically all cases the jaws grip a cylindrical surface of the workpiece, and as long as the gripping surfaces of the jaws are plane it suffices to correct the radial positions of the jaws for satisfactorily clamping the workpiece even when the axis of its cylindrical surface does not coincide with the chuck axis. This is because the plane gripping surfaces of the jaws rest tangentially on the cylindrical surface of the workpiece even if due to the eccentricity the contact lines between the jaws and the cylindrical surface are not evenly distributed over 360°, when seen in a transversal cut.

However, in order to avoid excessive local pressures, and hence a possible damage to the cylindrical surface of the workpiece, it becomes ever more usual when a high precision is required to shape the gripping surfaces of the jaws as concave, cylindrical surfaces which are complementary to the convex surface of the workpiece and have practically the same radius. The aim of such a shape is to avoid an excessive local pressure of the jaws on small portions of the workpiece.

This, however, leads to the following problem. If due to an existing eccentricity the central plane of a jaw does not contain the chuck axis but passes outside the same, then the concave gripping surface of the jaw does not fit smugly on the corresponding convex cylindrical surface of the workpiece to be machined; when the chuck is being tightened, a lateral edge of the jaw that is parallel to the chuck axis hits the cylinder first. This happens because due to the eccentricity (when seen in a transversal cut normal to the chuck axis) a moon-shaped gap which ends in a sharp angle exists between the gripping surface and the cylinder. This produces an asymmetrical, locally very high pressure on the workpiece, at the place where the acute angle presses on it; it results in bending the workpiece between the centers in a way that is noticeable when machining with very high precision. Further, this can generate undesirably high local pressures and produce markings on the surface of the workpiece.

One way to avoid such a tilted sit of the jaws on the workpiece and also the bending and possible deterioration of the same which this entails consists in using so-called rocking jaws. These are additional jaws fitted onto the main jaws of the chuck and able to pivot with respect to the latter jaws around a tilt axis parallel to the chuck axis. This can be achieved e.g. by mounting each additional jaw on a pin parallel to the chuck axis so that the additional jaw can tilt around the pin. Rocking jaws are mainly used when the jaw pressure exerted on the workpiece must be distributed as evenly as possible across the periphery of the workpiece, particularly when it is thin-walled. In this case one preferentially uses rocking jaws which extend tangentially fairly far away from their pins in both directions and which have a surface looking towards the workpiece that is shaped so that it rests on the same only near its extremities, that is at two places which lie as far away from the pin as possible in two opposite directions. Thereby the pressure exerted on the workpiece is better distributed over its periphery, e.g. when the chuck has three jaws the pressure is distributed over six places instead of only three when using rigid jaws. The tilting automatically distributes the pressure of each main jaw automatically and evenly over both support surfaces of the rocking jaw mounted on it.

As a side effect, rocking jaws also correct a possibly inadequate orientation of the main jaws towards the chuck axis, because as each rocking jaw comes to rest on the workpiece it orients itself according to the surface of the workpiece, which avoids a skew seat of the jaws on the workpiece. However, this entails several drawbacks if the chuck is intended for an extremely precise machining. More and more often such chucks are hermetically sealed and filled with oil so that the journals of its mutually movable parts are enclosed in an oil bath which protects them against dust, grinding residues and the like. This reduces their wear to a nearly unmeasurable minimum. But the rocking jaws and the journals of its rocking pins necessarily lie outside the oil enclosure of the chuck. Therefore, the unprotected journals of the rocking pins which are not immersed in an oil bath are subjected to more intensive dirtying, which generates an increased wear and premature play. In addition, the rocking jaws and their journals are additional, movable pieces inserted between the main jaws and the workpiece, which is detrimental to the precision of the chuck. Further, the comparatively small dimensions of the rocking pins necessitated by the overall space available make it difficult to obtain a minimum of wear. For these and other reasons, rocking jaws are not used in high precision chucks in order to avoid a skew fit of the jaws on the workpiece.

It is an aim of the invention to propose a chuck which avoids a skew fit of the jaws on a eccentrically mounted workpiece, and the elements of which have journals that can be enclosed within the sealed cavity of a chuck, and which allows to use particularly large pivoting surfaces which suffer a minimum of wear. The chuck of the invention further comprises comparatively few parts because its main jaws fulfil two tasks simultaneously, to wit the gripping of the workpiece through a radial movement, and the swivelling required in order to avoid a skew fit.

BRIEF DESCRIPTION OF THE DRAWINGS

To this end the invention is defined as recited in the main claim. It will now be illustrated in more details through the description of a preferred embodiment, and with the help of the drawing. In the drawing FIG. 1 schematically shows a cut through a known chuck and a workpiece clamped in it, the cut being transversal to the rotation axis.

DETAILED DESCRIPTION OF THE INVENTION

Figure 1:
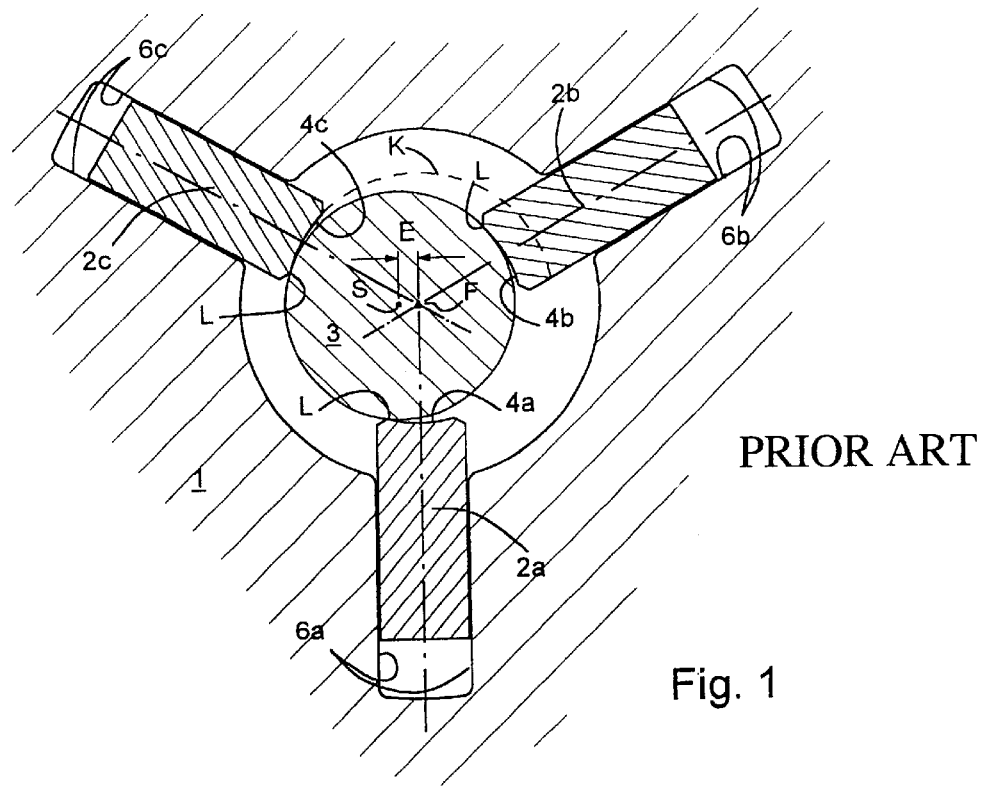

FIG. 1 shows a very schematic cut normal to the rotation axis of a known chuck 1 mounted on a machine tool, transversally through the jaws 2a, 2b, 2c and through the workpiece 3 which is to be machined. This workpiece is mounted in the machine tool (not shown) between centers (also not shown), with a rotation axis that is essentially orthogonal to the plane of the drawing and traverses it at point S, while the rotation axis of the chuck traverses the plane of the drawing at the intersection F of the middle planes of the jaws 2. For clarity, the eccentricity due to unavoidable errors, i.e. the distance E between the essentially mutually parallel axes S and F, has been exaggerated. For the same reason the additional jaws which in practice are often mounted on the main jaws in order to gently grip the workpiece are not shown. To this end, these rocking jaws generally have a form that is adapted to the shape of the workpiece at the place where they must grip it. For simplicity, in the example shown the workpiece is gripped directly by the jaws 2 which therefore have gripping surfaces 4a, 4b, 4c with a hollow cylindrical shape, the radius of which is practically the same as that of the cylindrical surface of the workpiece 3.

The jaws 2 glide in the guides 6a, 6b, 6c of the chuck 1, which are arranged at 120° intervals around the rotation axis F. They can be pressed radially against the workpiece 3 in a known manner by the action of a mechanical or hydraulic device (not shown) in order to impart to the workpiece a moment that is e.g. sufficient for grinding. Because the workpiece is mounted on centers (not shown) and hence rotates around their axis S which due to unavoidable errors does not coincide with the rotation axis F of the chuck, the pressure means which urge the jaws are built so that in spite of the existing distance between S and F all jaws exert the same pressure on the workpiece 3 even though they have different radial positions when they come into contact with it, as shown in the figure. In this figure the difference between the positions of jaw 2b and 2c is highlighted by a broken circular line K centered on the point F.

In spite of this known, automatic compensation the situation shown in FIG. 1 is unsatisfactory, because due to the eccentricity each jaw only rests on the workpiece along an edge L normal to the plane of the drawing in which it appears as a point. Because the so-called non-circular grinding (specially of crankshafts) requires a large moment which in turn necessitates a correspondingly high pressure of the jaws on the workpiece, the later can be damaged along the pressure lines L, and even be noticeably bent between the points where it is held by the centers. This is not acceptable when very high precision grinding is required.

Figure 2:
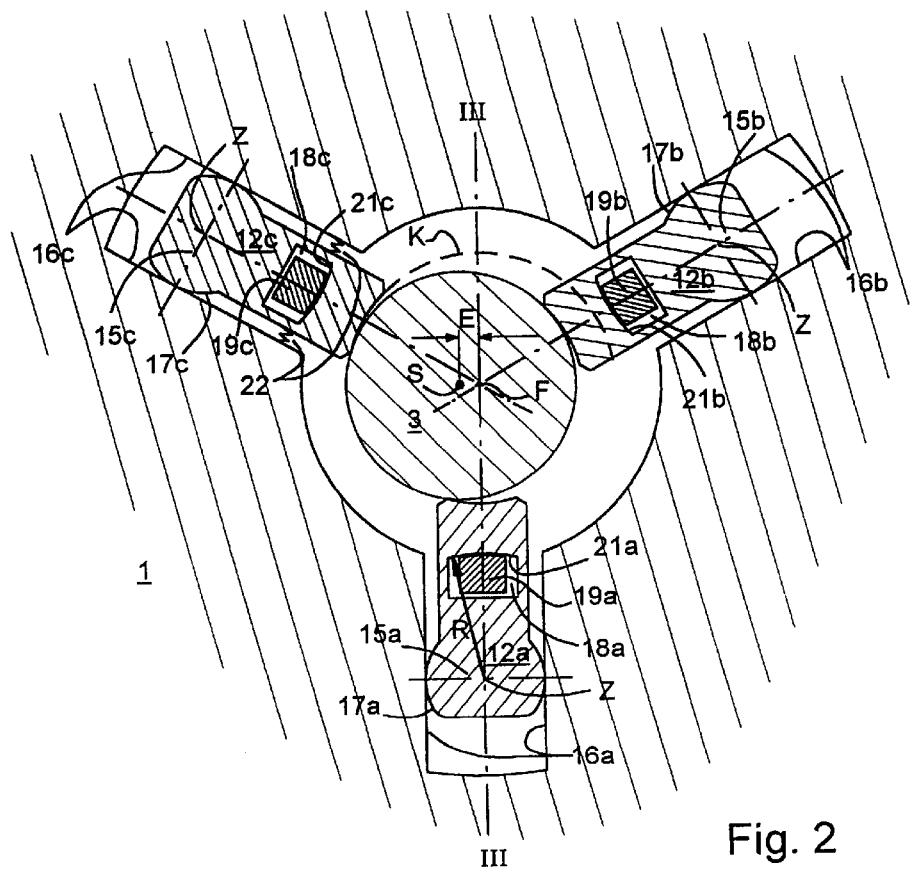
FIG. 2 shows a cut analogous to that FIG. 1 through an embodiment of the invention at the instant when the jaws make contact with the workpiece when the chuck is being closed, FIG. 3 very schematically shows a partial cut, which is not to scale, along line III—III of FIG. 2.

FIG. 2 shows a schematical cut analogues to that of FIG. 1, but through a chuck according to the invention at the instant when its inwardly moving jaws come into contact with the workpiece. Note that equivalent elements carry either the same number as in FIG. 1, or a number increased by 10.

Figure 3:
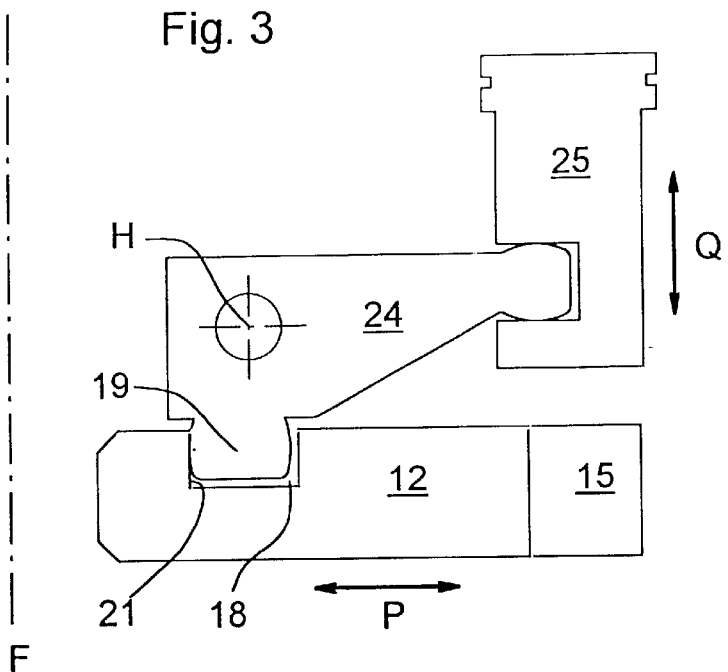

In the same way as in FIG. 1, the chuck here comprises three jaws arranged at 120° interval in radial guides 16a, 16b, 16c, but here the jaws are guided differently; each jaw 12a, 12b, 12c comprises an enlarged part 15a, 15b, 15c called a glide-head which can glide in the corresponding slideway. In the simplest embodiment shown here the lateral bearing surfaces 17a, 17b, 17c of the glide-heads are cylindrical, with an axis Z-parallel to the chuck axis F, such that the glide-heads 15, and therewith the jaws 12, can glide without tilting and without play in the guides 16, and that each can further more swivel by a certain amount around the axis Z. The bearing surfaces 17 of the glide-heads can be formed differently, e.g. in the shape of barrels. Each jaw 12 comprises a recess or cavity 18a, 18b, 18c for receiving a finger 19a, 19b, 19c which is urged radially by the means commanding the jaws (not shown). The surfaces 21a, 21b, 21c facing radially outwards of each recess are shaped as a portion of a hollow cylinder with an axis that coincides with the swivel axis Z of the corresponding glide-head 15, as indicated for the jaw a by the radius R. If the finger 19 moves in a straight line then a surface of this finger which faces radially inwards is a convex, cylindrical surface complementary to the surface 21 and which has essentially the same radius. If (as shown in FIG. 3) the finger 19 lies at one end of an angled lever and therefore does not move exactly radially but along an arc of circle, than its surface which faces radially inwards will in addition have a certain curvature around an axis parallel to the axis of the lever; the finger will hence be barrel-shaped. When a jaw is pushed radially inwards by the pressure of the corresponding finger 19, it can swivel by a certain amount around the axis Z of its glide-head without moving radially. The possible extent of the swivelling movement depends mainly on the difference between the width of the finger 19 and that of the recess or cavity 18 into which the finger is engaged.

In any case the maximal possible tilt does not exceed a few degrees and therefore it does not impede the mounting of elastic seals (not shown) between each jaw and the body of the chuck. Such seals are often provided on high precision chucks in order to protect the inner mechanism of the chuck against grinding dust and similar dirt in order to maintain its precision over a long useful life. For very exacting requirements one can fill the chuck with an oil bath, and rubber seals are then necessary in order to retain the oil.

Elastic pull-back devices can be provided for recalling the jaws into 120°-division, that is in the rest position shown in FIG. 2 when no notable tangential forces bear on them. This possibility is illustrated in a very schematical way in FIG. 2 in which it is moreover only shown for the upper left-hand jaw; there, two elastic elements 22 are sketched, which will keep the jaw approximately parallel to its guide when no other load is applied to it. Such pull-back means are actually unnecessary when the eccentricity E is sufficiently small, but it is supposed that they exist in the embodiment shown here in order to simplify the description of the way the invention functions when starting from the rest position shown in FIG. 2, where all jaws point towards the chuck axis F.

FIG. 3 schematically shows a partial cut along a line III—III of FIG. 2, but without the workpiece; the approximate position of the same is only hinted at by the axis F. As the mechanism shown here occurs once for each of the three jaws shown in FIG. 2, the additional reference letters a, b, c are not shown in FIG. 3. A double-headed arrow P indicates the movement of the jaw 12 in the direction of the chuck axis F which is necessary in order to grip the workpiece (not shown) and to release it; during this movement the sliding head 15 glides in the guide 16 (not shown in FIG. 3). The jaw 12 is urged in the direction of the double-headed arrow P by an angled lever 24 which can pivot around an axis H and has a finger 19 which fits into the recess 18 of the jaw 12. The axis H is normal to the axis F of the chuck, and the pivoting of the angled lever 24 is obtained through the action of a piston 25 urged (in a way not shown) hydraulically in a direction parallel to the chuck axis F, as indicated by the double-headed arrow Q. In order to obtain an irreproachable transmission of the force exerted by the finger 19 on the jaw 12 when the lever 24 pivots, the finger has a rounded bearing surface which can be seen in the cut represented by FIG. 3. When taken together with the rounded shape, visible in FIG. 2, of the finger in a plane normal to that of FIG. 3 this gives the finger 19 a barrel-like shape over at least a portion of its periphery.

Figure 4:
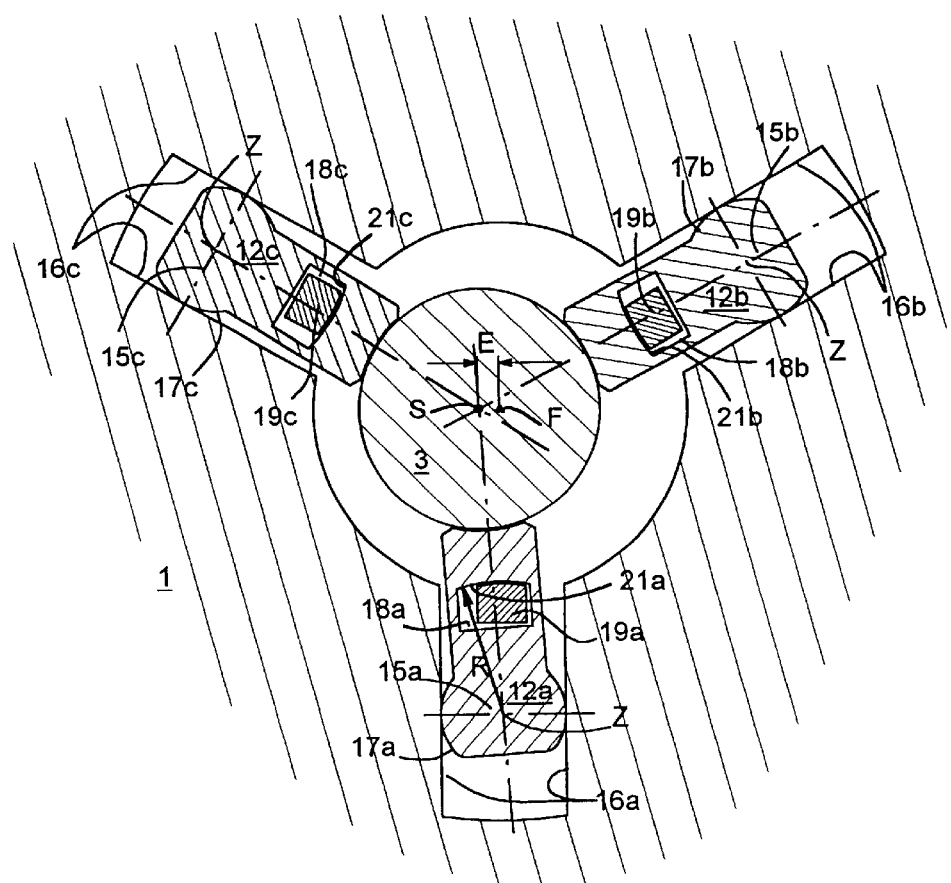
FIG. 4 shows the same cut as in FIG. 2 but after the chuck has been fully closed.

It is now supposed that a chuck according to the invention, the jaws of which are at first in their rest position is progressively tightened on a workpiece mounted on centers. When the jaws come into contact with the workpiece the known compensating means (not shown) for the radial movement will balance the advance of each jaw so that they all touch the workpiece before a notable and equal pressure is exerted on the workpiece by all jaws. At that instant one has the situation shown in FIG. 2 (which is similar to that shown in FIG. 1 for a previously known chuck). The jaws do not rest evenly, that is without warp, on the surface of the workpiece but only touch the workpiece along their edges L. If the clamping force of the jaws is now increased further through an increasing pressure of the fingers 19 directed radially inwards, then the warped position of the jaws on the workpiece will create tangential forces which act on the jaws and swivel these around the swivel axis' Z until the bearing surfaces of all jaws 12 rest evenly on the workpiece 3, as shown in FIG. 4. The workpiece is thus carefully clamped, and will not be damaged even by a high clamping pressure, even though the forces generated by the fingers 19 intersect at the chuck axis F, not at the rotation axis S of the workpiece 3, which is at a distance E from F.

It must be noted expressly that the position of the recesses or cavities 18 (and hence of the fingers 19) shown in the described embodiment between the swivel axis Z and the surface of the corresponding jaw that clamps the workpiece is arbitrary. Depending on the construction of the chuck another position can be preferable, where the finger and the recess are e.g. further away from the chuck axis than the swivel axis Z, or where the finger is for example located at the same place as the swivel axis so that it does not noticeably restrain the swivelling of the jaw even when a large clamping force is applied. Also, only an embodiment of the invention with three jaws has been described because this is by far the most usual configuration; chucks according to the invention can be realized in the same way with a different number of jaws, in particular two or four. Also, the parts which are here called "jaws" can be so-called base jaws which do not clamp directly on the workpiece but are shaped so as to be provided with additional shoes the shape of which is adapted to that of the workpiece.

What is claimed is:

1. Chuck for a machine tool, characterized by jaws with two degrees of freedom relatively to the main body of the chuck, a translatory degree of freedom in an essentially radial direction with respect to the rotation axis of the chuck, and a limited rotational degree of freedom around a swivel axis essentially parallel to the rotation axis of the chuck, which swivel axis follows the radial displacement of the corresponding jaw, each jaw comprising a sliding head with a support surface that is at least partially rotationally symmetric with respect to the swivel axis and glides in a radial slideway of the chuck.

2. Chuck according to claim 1, characterized in that each jaw comprises a bearing surface looking away from the rotation axis of the chuck and which is at least in part rotationally symmetric with respect to the swivel axis, for supporting the pressure exerted by a transmission piece which transmits the clamping force of the chuck to the jaw.

3. Chuck according to claim 2, characterized in that the bearing surface is a wall of a recess provided in the jaw.

4. Chuck according to claim 2 or 3, characterized in that the transmitting piece is a lever which pivots about a tilt axis placed outside the jaw and which is essentially orthogonal to the rotation axis of the chuck and to the radial movement of the jaw, where the surface of the lever which bears on the jaw is at least in part rotationally symmetric around its pivot axis.

5. Chuck according to claim 2, characterized in that the bearing surface lies between the swivel axis and the surface of the jaw, or of a shoe sitting on the same, which grips the workpiece.

6. Chuck according to claim 2, characterized in that the bearing surface is further away from the surface of the jaw, or of the shoe of same, which grips the workpiece than the swivel axis.

7. Chuck according to claim 2, characterized by an elastic pull-back device for returning each jaw in a position where it points at the rotation axis of the chuck when the jaw is open.

8. Chuck according to claim 7, characterized in that the rotational degree of freedom does not exceed 5 degrees.

9. Chuck according to claim 4, characterized in that the bearing surface lies between the swivel axis and the surface of the jaw, or of a shoe sitting on the same, which grips the workpiece.

10. Chuck according to claim 4, characterized in that the bearing surface is further away from the surface of the jaw, or of the shoe of same, which grips the workpiece than the swivel axis.

11. Chuck according to claim 6, characterized by an elastic pull-back device for returning each jaw in a position where it points at the rotation axis of the chuck when the jaw is open.

* * * * *

UNITED STATES PATENT AND TRADEMARK OFFICE
CERTIFICATE OF CORRECTION

PATENT NO. : 6,746,024 B2
DATED : October 18, 2004
INVENTOR(S) : Erwin Bohler

Page 1 of 1

It is certified that error appears in the above-identified patent and that said Letters Patent is hereby corrected as shown below:

Column 4,
Line 22, delete "hyphen" between "Z" and "parallel".
Line 25, delete "further more" and insert -- furthermore --.

Signed and Sealed this

Twenty-second Day of March, 2005

JON W. DUDAS
*Director of the United States Patent and Trademark Office*